US007269534B2

United States Patent
Mugunda et al.

(10) Patent No.: US 7,269,534 B2
(45) Date of Patent: Sep. 11, 2007

(54) METHOD TO REDUCE IPMB TRAFFIC AND IMPROVE PERFORMANCE FOR ACCESSING SENSOR DATA

(75) Inventors: Chandrasekhar Mugunda, Austin, TX (US); Philip Dale Chidester, Austin, TX (US); Mukund Purshottam Khatri, Austin, TX (US); Wayne Robert Weilnau, Jr., Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/078,884

(22) Filed: Mar. 11, 2005

(65) Prior Publication Data

US 2006/0206286 A1 Sep. 14, 2006

(51) Int. Cl.
*G06F 13/00* (2006.01)
(52) U.S. Cl. .................. 702/182; 702/186; 710/33
(58) Field of Classification Search .............. 702/182, 702/188, 127, 186, 187, 80, 119, 123
See application file for complete search history.

(56) References Cited

U.S. PATENT DOCUMENTS

| 6,772,099 | B2* | 8/2004 | Merkin et al. ........... 702/188 |
| 6,904,391 | B2* | 6/2005 | Merkin et al. ........... 702/188 |
| 2003/0005275 | A1 | 1/2003 | Lam ........................ 713/2 |
| 2003/0070115 | A1 | 4/2003 | Nguyen et al. ............ 714/23 |
| 2003/0182483 | A1 | 9/2003 | Hawkins .................... 710/110 |
| 2004/0034764 | A1 | 2/2004 | Bulusu et al. .............. 713/1 |
| 2004/0073806 | A1 | 4/2004 | Zimmer .................... 713/189 |
| 2004/0098521 | A1 | 5/2004 | Lin ......................... 710/72 |
| 2004/0133398 | A1 | 7/2004 | Merkin et al. ........... 702/188 |
| 2004/0158702 | A1 | 8/2004 | Haruhisa ................... 713/2 |
| 2004/0228063 | A1 | 11/2004 | Hawkins et al. ......... 361/115 |
| 2004/0236936 | A1 | 11/2004 | Bulusu et al. .............. 713/2 |
| 2004/0254767 | A1 | 12/2004 | Merkin et al. ........... 702/188 |
| 2004/0260936 | A1 | 12/2004 | Hiray et al. ............... 713/200 |
| 2004/0268107 | A1 | 12/2004 | Zimmer et al. ............ 713/1 |
| 2004/0268116 | A1 | 12/2004 | Vasisht et al. ........... 713/100 |
| 2004/0268140 | A1 | 12/2004 | Zimmer et al. ........... 713/200 |
| 2005/0010811 | A1 | 1/2005 | Zimmer et al. ........... 713/201 |
| 2005/0038808 | A1 | 2/2005 | Kutch ...................... 707/102 |
| 2005/0216627 | A1* | 9/2005 | Goud et al. ............... 710/100 |
| 2006/0004824 | A1* | 1/2006 | Hsieh et al. .............. 707/102 |

OTHER PUBLICATIONS

Zhuo, et al., *Remote Management With The Baseborad Management Controller In Eighth-Generation Dell PowerEdge Servers*, Dell Power Solutions, pp. 26-29, Oct. 2004.
*Intelligent Platform Management Interface Specification Second Generation*v 2.0, Feb. 12, 2004.

* cited by examiner

*Primary Examiner*—Hal Wachsman
(74) *Attorney, Agent, or Firm*—Baker Botts L.L.P.

(57) ABSTRACT

An information handling system is provided with a BIOS and a baseboard management controller. The baseboard management controller is provided with non-standard functionality that enables the BIOS to request sensor data records of a specific type. Thus the BIOS can ask for specific kinds of sensor data, such as those for memory sensors only.

9 Claims, 4 Drawing Sheets

METHOD TO REDUCE IPMB TRAFFIC AND IMPROVE PERFORMANCE FOR ACCESSING SENSOR DATA

CROSS REFERENCE TO RELATED APPLICATION

This application is related to U.S. Pat. No. 6,904,391, Ser. No. 10/881,354 (Merkin, et al.); and U.S. Pat. No. 6,772,099, Ser. No. 10/338,309 (Merkin, et al.), both of which are herein incorporated by reference for all purposes.

BACKGROUND

1. Field of the Invention

The present invention relates to servicing and repairing machines. More specifically, the present invention relates to the servicing of equipment at remote (customer) locations.

2. Background of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Moreover, the information handling system may include one or more software applications, each of which can be composed of one or more software components.

Software components that access Baseboard Management Controller ("BMC") data, such as the Basic Input-Output System ("BIOS"), firmware on out-of-band management peripheral cards, and systems management software, have to read all of the meta data (e.g., IPMI Sensor Data Records ("SDR")) that describe the system's sensors from the BMC. Reading from the BMC is done even if only one particular sensor needs to be accessed. The typical size of an "SDR" is 64 bytes and a typical system has over one hundred SDR's. Therefore, the software has to read over 6400 bytes of data from the IPMB BUS. In addition, the parsing logic needs to be duplicated across all software that utilizes the IPMI SDR's. The reading and parsing cause performance degradation. For example, some information handling systems will have memory sensors. All of the data for the memory sensors will be provided by the BIOS during the POST phase of booting. In order for the BIOS to send the information for each sensor, the BIOS needs to know the address of each memory sensor. The BIOS thus must locate the memory sensors by reading all of the SDR's via the slow I2C bus and then parse each SDR. The reading and parsing steps adds considerable delay to the BIOS POST process. Moreover, the BIOS must also be equipped with logic to understand and interpret the SDR data records, increasing the size of the BIOS. There is, therefore, a need in the art for ameliorating performance degradation and reducing overhead costs for accessing BMC data.

SUMMARY OF THE INVENTION

The present invention solves the problems inherent in the art by providing a system and method for reducing bus traffic within an information handling system. Specifically, the information handling system is provided with a BIOS and an baseboard management controller. The baseboard management controller is provided with non-standard functionality that enables the BIOS to request sensor data records of a specific type. Thus the BIOS can ask for specific kinds of sensor data, such as those for memory sensors only. By limiting the amount of data retrieved by the BIOS from the BMC, slow moving traffic between the BIOS and the BMC can be reduced, thereby increasing overall system performance.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

Figure 1:
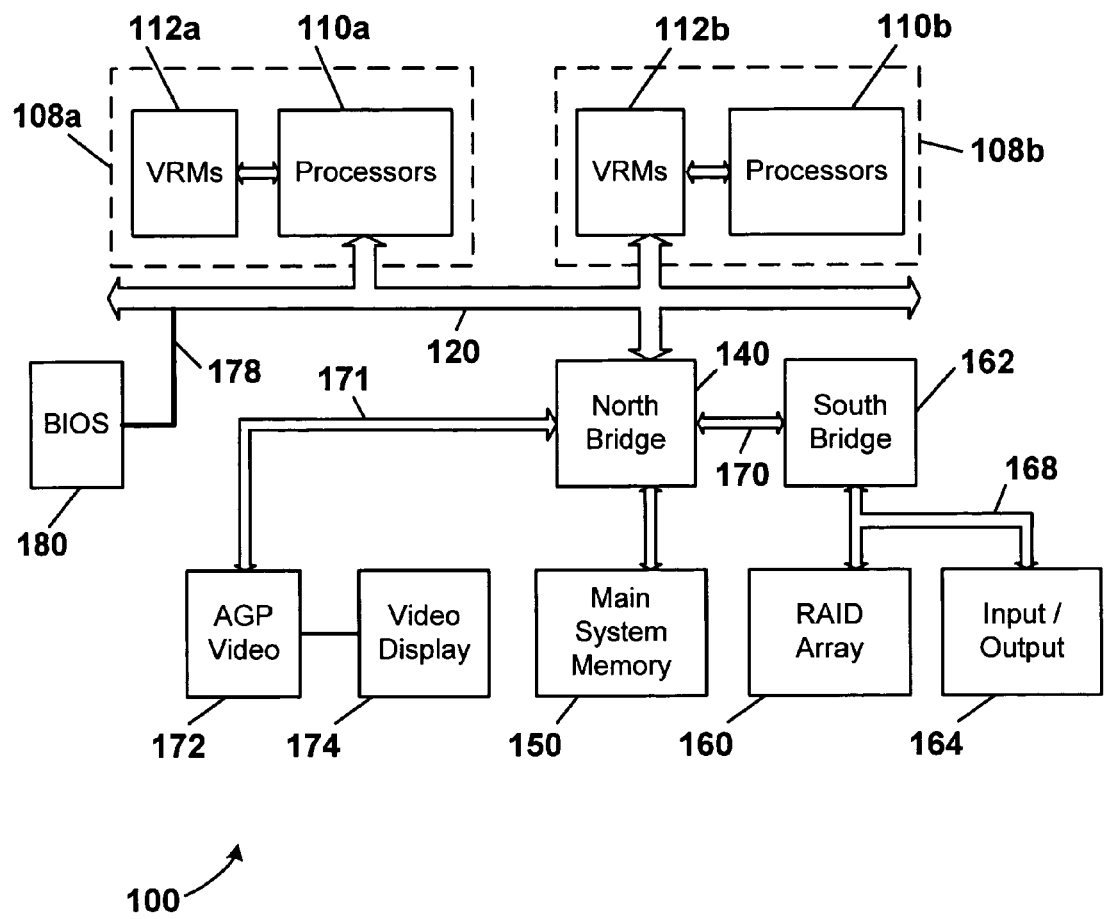
FIG. 1 is a block diagram illustrating an information handling system according to the teachings of the present invention.

The present disclosure may be susceptible to various modifications and alternative forms. Specific exemplary embodiments thereof are shown by way of example in the drawing and are described herein in detail. It should be understood, however, that the description set forth herein of specific embodiments is not intended to limit the present disclosure to the particular forms disclosed. Rather, all modifications, alternatives, and equivalents falling within the spirit and scope of the invention as defined by the appended claims are intended to be covered.

DETAILED DESCRIPTION

Elements of the present disclosure can be implemented on a computer system, as illustrated in FIG. 1. Referring to FIG. 1, depicted is an information handling system, generally referenced by the numeral 100, having electronic components mounted on at least one printed circuit board ("PCB") (not shown) and communicating data and control signals there between over signal buses. In one embodiment, the information handling system may be a computer system. The information handling system may be composed of processors 110 and associated voltage regulator modules ("VRMs") 112 configured as processor nodes 108. There may be one or more processor nodes 108, one or more processors 110, and one or more VRMs 112, illustrated in FIG. 1 as nodes 108a and 108b, processors 110a and 110b and VRMs 112a and 112b, respectively. A north bridge 140, which may also be referred to as a "memory controller hub" or a "memory controller," may be coupled to a main system memory 150. The north bridge 140 may be coupled to the processors 110 via the host bus 120. The north bridge 140 is generally considered an application specific chip set that provides connectivity to various buses, and integrates other system functions such as memory interface. For example, an INTEL® 820E and/or INTEL® 815E chip set, available from the Intel Corporation of Santa Clara, Calif., provides at least a portion of the north bridge 140. The chip set may also be packaged as an application specific integrated circuit ("ASIC"). The north bridge 140 typically includes functionality to couple the main system memory 150 to other devices within the information handling system 100. Thus, memory controller functions, such as main memory control functions, typically reside in the north bridge 140. In addition, the north bridge 140 provides bus control to handle transfers between the host bus 120 and a second bus(es), e.g., PCI bus 170 and AGP bus 171, the AGP bus 171 being coupled to the AGP video 172 and/or the video display 174. The second bus may also comprise other industry standard buses or proprietary buses, e.g., ISA, SCSI, USB buses 168 through a south bridge (bus interface) 162. These secondary buses 168 may have their own interfaces and controllers, e.g., RAID Array storage system 160 and input/output interface (s) 164. The information handling system 100 may also be equipped with an Inter-IC bus, commonly known as the I²C bus 178, which is a control bus that provides the communications link between integrated circuits in the system 100. Finally, a BIOS 180 may be operative with the information handling system 100 via, for example, the I²C bus 178, as illustrated in FIG. 1. The information handling system 100 can be combined with other like systems to form larger systems. Moreover, the information handling system 100, can be combined with other elements, such as networking elements and or other information handling systems, to form even larger and more complex information handling systems such as, for example, clusters or other enterprise resource planning system, such as an enterprise resource planning portal.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory as described above. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The information handling system described above, or similar systems, may be used to implement the systems and methods described herein. It should be noted that the information handling system needed to implement the methods and systems described herein may be implemented in hardware, in software (in the form of one or more instructions), or in any combination of hardware or software. Moreover, no specific software language is required to implement the systems and methods described herein, and they may be implemented using any desired programming language.

Figure 2:
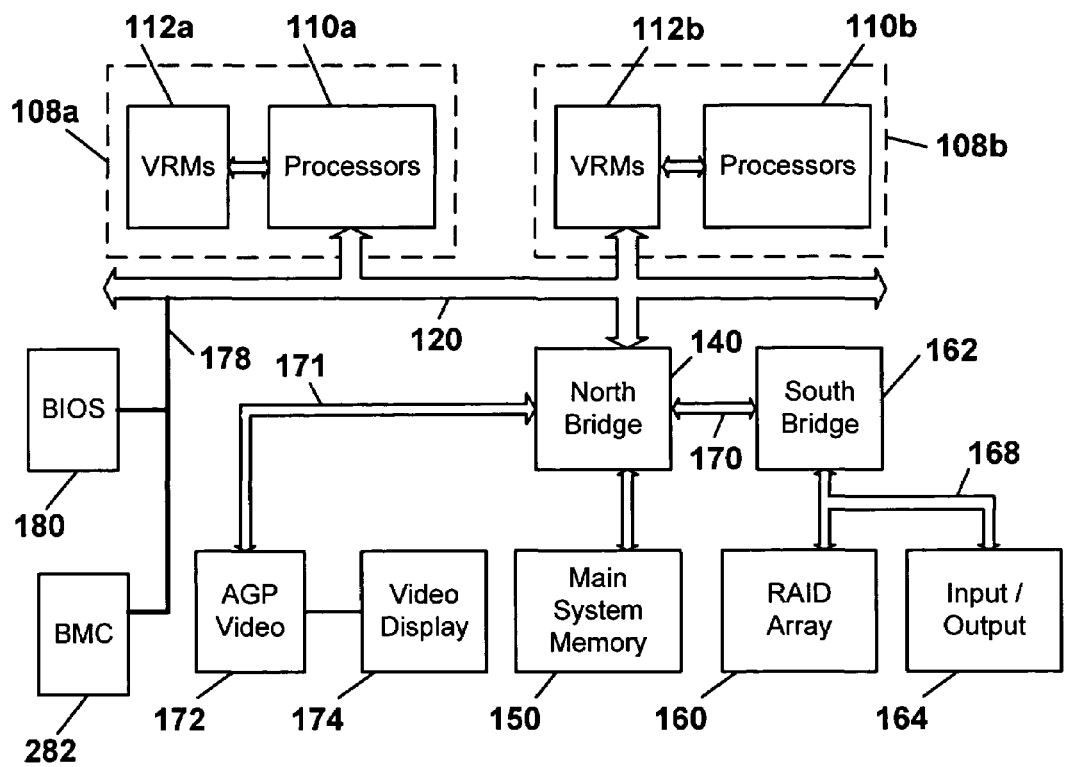
FIG. 2 is a block diagram illustrating an enhanced information handling system according to the teachings of the present invention.

The information handling system described above, or similar systems, can be equipped with an on-board microcontroller called the baseboard management controller ("BMC") 282, as illustrated in FIG. 2. The BMC 282, is compliant with the Intelligent Platform Management Interface ("IPMI") 1.5 specification that is available from the Intel Corporation of Santa Clara Calif. The IPMI specification defines standardized, abstracted interfaces to the platform management subsystem. The BMC 282 can form the corpus of the IPMI architecture and provides the intelligence behind intelligent platform management—the autonomous monitoring and recovery features implemented directly in platform management hardware and firmware. IPMI defines a set of common interfaces to the hardware and firmware that are used to monitor system health and to manage the system. Because operating, administering, and maintaining servers can represent a significant portion of total cost of ownership ("TCO"), any reduction in administrative processes through automation can help reduce TCO. The BMC 282 provides management capabilities that are designed to reduce TCO through asset tracking; automatic alerting, shutdown, and restart; and manual remote restart and power control.

One significant addition to the IPMI 1.5 specification is an interface that enables standard messaging and alerting through direct serial, IPMI over local area network (LAN), and serial over LAN (SOL) connections. This IPMI 1.5 feature helps provide administrators with remote access to manage the platform, even when the operating system (OS) or systems management software is not available or when the system is powered off. The standard also defines an alerting mechanism for the system to generate and send a Simple Network Management Protocol (SNMP)-based Platform Event Trap (PET) when a monitored event condition occurs. IPMI messaging and alerting enable remote management of the BMC 282: IPMI messaging can be used to query platform status, review hardware logs, or issue other requests from the remote console, which can also be notified of events or alerts through IPMI alerting functions.

IPMI is best used with systems management software running under the OS, which offers an enhanced level of configuration and manageability by providing in-band (OS-present) access to IPMI management information and by integrating IPMI with additional management functions. Appropriate systems management software can provide sophisticated management for the BMC 282 that is compliant with IPMI 1.5. Specifically, a BIOS Setup (Option ROM) Utility can be invoked during the BIOS 180 power-on self-test ("POST") sequence to enable administrators to configure a subset of the BMC 282 for remote management. It sets up the most commonly used, quickest configuration of the BMC 282.

Software components that access the BMC 282 data, such as the BIOS 180, firmware on out-of-band management cards (not shown) and system management software have to read from the BMC 282 all of the meta data that describe the system sensors. Under the IPMI, that meta data is stored in one or more sensor data records ("SDR"). The typical size of an SDR is 64 bytes and a typical information handling system 200 has over one hundred SDRs.

Some information handling systems 200 have memory sensors. All of the data for the memory sensors are provided by the BIOS 180 during the POST phase of the boot process. In order for the BIOS 180 to provide the information for each sensor, the BIOS must know the address of each memory sensor. The BIOS 180 locates the addresses for the memory sensors by reading all of the SDR's in the BMP 282 via the slow I²C bus 178, and then parses them.

Figure 3:
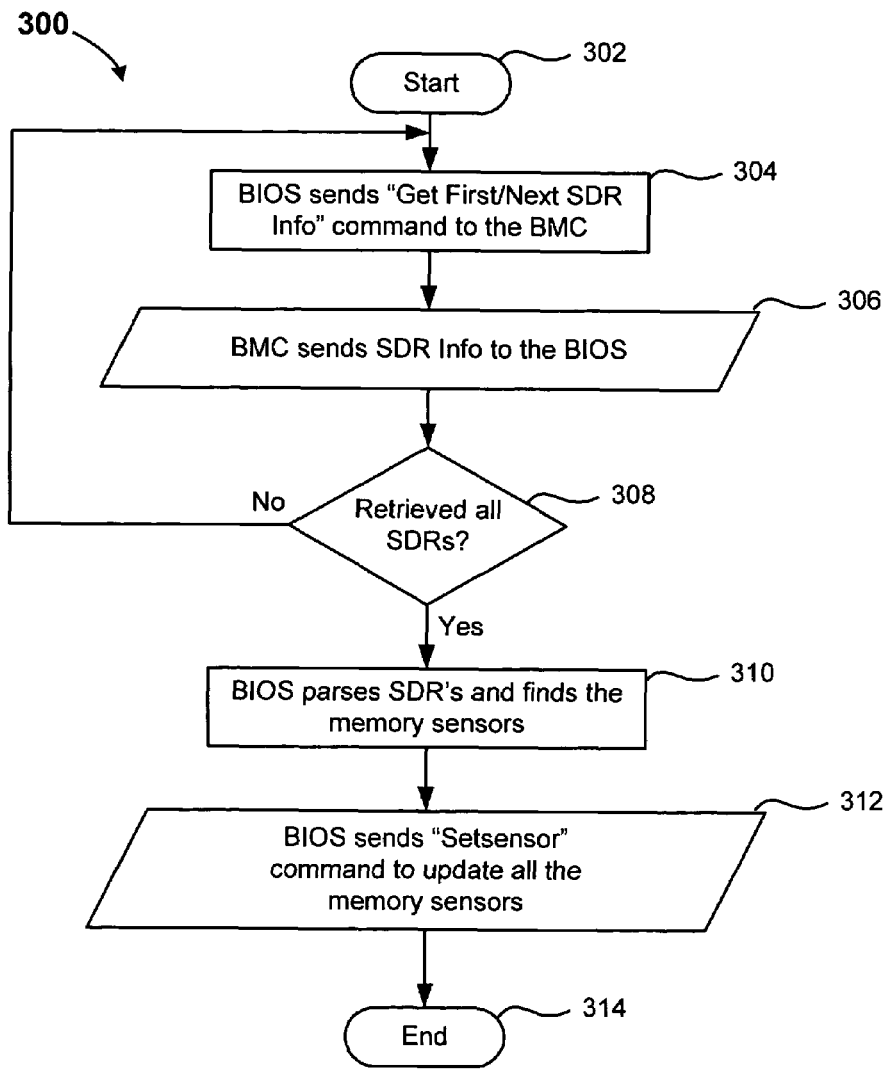
FIG. 3 is a flowchart illustrating a first communications protocol between two elements of the information handling system according to the present invention.

A protocol between a standard BMC 282 and a BIOS 180 is illustrated in FIG. 3. Specifically, the method 300 begins with step 304 where the BIOS 180 sends a "Get First/Next SDR Info" command to the BMC 282. When this step is initially invoked, the first SDR is returned. Thereafter, the next (non-read) SDR is returned. While the SDRs can be read sequentially or systematically, there is no specific requirement that they be read in any particular order. In step 306, the BMC 282 sends the SDR to the BIOS 180. The BIOS 180 can send one or more "Get SDR Record" commands to obtain the SDRs for the first through the Nth sensors (regardless of sensor type). For each "Get SDR Record" command from the BIOS 180, the BMC 282 sends an SDR to the BIOS 180. Because the BMC 282 does not discriminate between sensors, the result of the successive steps 304, 306 and 308 results in the BIOS having a copy of all of the SDRs. Because an SDR can be for a non-memory sensor, the BIOS 180 must parse the list of SDRs to find the ones related to the memory sensors (see step 310). Once found, the BIOS sends a "Setsensor" command to update all of the memory sensors (step 312). The Setsensor command is used to set the health of the memory sensor (such as present/absent, good, bad, throttled, etc.).

To implement the functionality described herein, the following example solution is proposed to mitigate the problems in the prior art and to improve the overall performance of the infomration handling system 200. Any software process that needs sensor addresses can issue a new command, such as "GetSensorInformationFromSensorType( )" in which the input would be the sensor type that the software wants to monitor/control. The response from the BMC 282 may be the addressing data that is needed to issue IPMI commands to specific sensors. The command could be modeled as follows:

In the Request Data, there could be a) sensor type (FFh=reserved); and b) a handle. The initial value of the handle could be "0". If the request data call is made subsequently because there is more sensor addressing data than can be returned in a single call, the handle could be returned from the previous request.

In the Response Data, there could be information for the number of sensors (of the requested type), often designated as "N"; a handle (perhaps with the value "ff" meaning there is no more data); and a list of sensor data, each element of the list having the sensor number and the owner identifier, preferably for all N sensors.

When the BMC 282 receives the GetSensorInformationFromSensorType command, it will search its SDR table for records that represent sensors of the type specified in the request. All matches will be placed in a response buffer that the BMC 282 returns to the requester. The requester will then iterate through the response record, utilizing the sensor addressing data to access the specific sensors.

Figure 4:
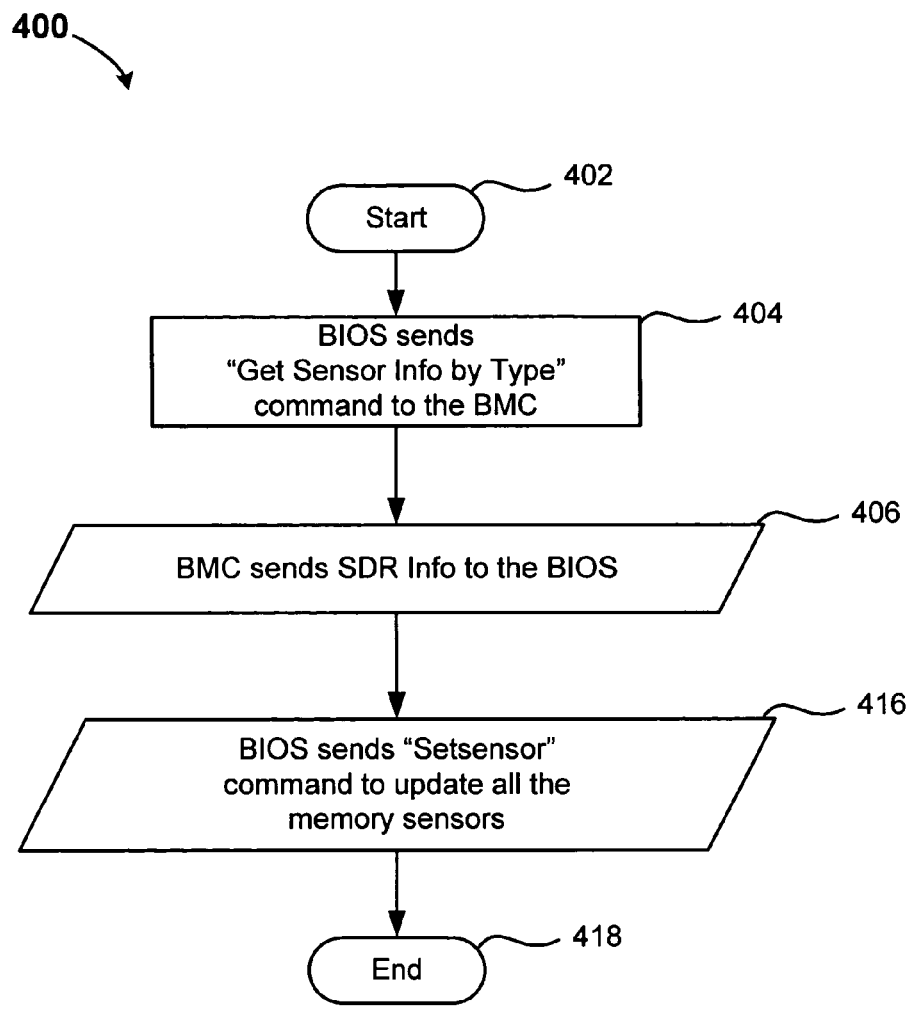
FIG. 4 is a flowchart illustrating a second communications protocol between two elements of the information handling system according to the present invention.

In another embodiment, the BMC 282 can be constructed to accept an additional command, namely a command to return sensor info by type. With that functionality, the BIOS 180 merely needs to send a single command to the BMC 282 specifying "memory sensor" or the like as the parameter in the call statement. FIG. 4 illustrates this embodiment. Referring to FIG. 4, the method 400 begins with the BIOS 180 sending a "GetSensorInformationFromSensorType" command to the BMC 282 (step 404). The BMC 282 responds by sending addressing data that is needed to issue IPMI commands to specific sensors to the BIOS 180 (step 406). At that point, the BIOS 180 merely sends the Setsensor command to update the memory sensors (step 416). This embodiment eliminates several steps (illustrated in FIG. 3) and thus eliminates much of the slow IPMB traffic over the I²C bus and thus increases overall performance of the information handling system 200.

In yet another embodiment, the BMC 282 can be constructed to accept an additional command, namely return only memory sensor info, so that the BIOS need send a shorter signal, illustratively entitled "GetMemorySensorInformation" (with no parameters) to achieve the same functionality noted in the previous paragraph. This embodiment also eliminates several steps (illustrated in FIG. 3) and thus eliminates much of the slow IPMB traffic over the I²C bus and thus increases overall performance of the information handling system 200. Moreover, this alternate embodiment reduces traffic further by limiting the initial signal emanating from the BIOS 180 to the BMC 282. Still more alternate embodiments are possible by using other call statements asking for specific subsets of the SDR list from the BMC 282.

It will be understood by those skilled in the art that each step depicted above may be given additional or lesser subtasks so that each step is capable of variation yet achieve the same result. Similarly, the order or duties of each step can be modified to provide a correspondingly different result.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system comprising:
   a BIOS;
   a baseboard management controller operative with the BIOS, the baseboard management controller storing two or more sensor data records concerning two or more types of sensors, the baseboard management controller further sending records of a specific type of sensor to the BIOS upon receiving a specific call statement from the BIOS;
   wherein the BIOS can utilize the information in the records of the specific type of sensor.

2. The information handling system of claim 1, wherein the information is an address.

3. The information handling system of claim 1, wherein the information is a property.

4. A method for retrieving information from a baseboard management controller by a BIOS comprising:

sending by the BIOS a get information call to the baseboard management controller specifying a sensor type;

generating one or more sensor data records related to the sensor type by the baseboard management controller; and sending the one or more sensor data records related to the sensor type to the BIOS.

5. The method of claim 4, wherein the information is an address.

6. The method of claim 4, wherein the information is a property.

7. A method for retrieving information from a baseboard management controller by a BIOS comprising:

sending by the BIOS a call to the baseboard management controller specifying a sensor type and asking for one or more sensor data records related to one or more sensors of the specified sensor type;

generating the one or more sensor data records by the baseboard management controller; and sending the one or more sensor data records to the BIOS.

8. The method of claim 7, wherein the one or more sensor data records contains an address.

9. The method of claim 7, wherein the one or more sensor data records contains one or more properties.

* * * * *